United States Patent [19]

Groth

[11] 4,188,452
[45] Feb. 12, 1980

[54] HEAT-REFLECTING GLASS PANE

[75] Inventor: Rolf Groth, Bochum-Wattenscheid, Fed. Rep. of Germany

[73] Assignee: BFG Glassgroup, Paris, France

[21] Appl. No.: 839,938

[22] Filed: Oct. 6, 1977

[30] Foreign Application Priority Data

Oct. 15, 1976 [DE] Fed. Rep. of Germany ....... 2646513

[51] Int. Cl.$^2$ .......................... G02B 27/00; B32B 9/04
[52] U.S. Cl. ..................................... 428/336; 428/404; 428/428; 428/432; 428/446; 428/448; 350/166; 350/291; 65/60 R; 427/167
[58] Field of Search ............... 428/333, 336, 446, 448, 428/404, 428, 432; 65/60 R

[56] References Cited

U.S. PATENT DOCUMENTS

| | | | |
|---|---|---|---|
| 2,478,817 | 8/1949 | Gaiser | 65/60 R |
| 3,767,463 | 10/1973 | Aboaf et al. | 428/446 |
| 3,778,338 | 12/1973 | Murphy et al. | 428/428 |
| 3,811,753 | 5/1974 | Onoki et al. | 428/446 |

OTHER PUBLICATIONS

Abstract, German Patent #1771575, 7/12/72, Matsushita Electronics Corp.

*Primary Examiner*—P. C. Ives
*Attorney, Agent, or Firm*—Hill, Van Santen, Steadman, Chiara & Simpson

[57] ABSTRACT

A heat reflecting pane comprises a substantially transparent glass substrate which has a layer of silicon oxide thereon and a layer of titanium dioxide in the rutile form on the side of the silicon oxide layer remote from the glass pane, the glass substrate having been toughened by heat treatment. The pane is formed by coating the glass substrate with a thin layer of silicon oxide, then applying a layer of titanium to the silicon oxide layer by vacuum deposition, the oxidizing the titanium at over 550° C. to form titanium oxide in the rutile form.

The silicon oxide layer prevents the rutile layer from becoming opaque when the pane is heated to the temperature necessary for heat treatment of the glass substrate, which may be during the heating step in which the titanium is oxidized or may be subsequently.

7 Claims, 1 Drawing Figure

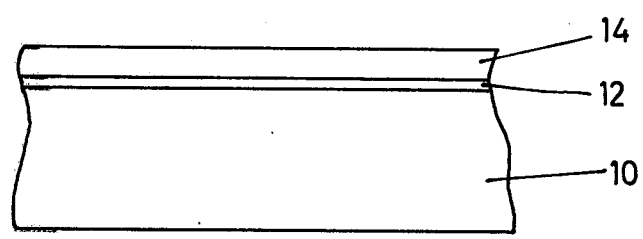

HEAT-REFLECTING GLASS PANE

FIELD OF THE INVENTION

The invention relates to a heat-reflecting pane or panel comprising a substantially transparent glass substrate, for example of soda-lime-silicate glass, and further comprising a layer of $TiO_2$ in the rutile form, formed by applying a Ti layer by vapour deposition in vacuo and subsequent oxidation of such layer at high temperature.

Heat-reflecting window glass panes of this kind in which a heat-reflecting $TiO_2$ layer is applied by vapour-coating of a titanium layer in vacuo and subsequent oxidation of such layer at very high temperatures in air are known and have been described e.g. in a publication by G. Hass entitled "Preparation, Properties and Optical Applications of Thin Films of Titanium Dioxide" (G. Hass, Vacuum, Vol. 2, No. 4, pp. 331–345 (1952)). Depending upon the conditions in which the Ti layer is vapour-coated in vacuo, there are two $TiO_2$ forms which may be produced in the subsequent oxidation of the Ti layer. When the titanium is vapour-coated rapidly in a good vacuum—i.e., of $\simeq 10^{-5}$ mm Hg or even harder—the rutile form is produced, whereas if vapour coating proceeds relatively slowly in a less hard vacuum, e.g. of approximately $10^{-4}$ mm Hg, the anatase form is produced. $TiO_2$ layers produced in this way have a variety of uses in optics to coat glass panes, e.g. as colour filters and as sunshine-reflecting coatings, the thickness of the layer being made such as to act as a highly effective quarter-wave interference layer, over the spectral range for which a modification of the reflection properties of the substrate is required.

One particular purpose for which heat-reflecting glass panes of the kind described are used is in facade elements or infilling panels for buildings. The requirements in the case of infilling panels of this kind are for $TiO_2$-coated glass panels which have a high neutral reflection—possibly with a slight blue or yellow tint—in the visible spectral range. The usual practice with panels of this kind is for the $TiO_2$ interference layer to be disposed on the outside of the building, the back of the glass substrate being treated with an opaque enamel or varnish, so that parts of the building behind the panel cannot be seen through it from the outside.

Films of $TiO_2$ in the rutile form are very advantageous, more particularly for the last mentioned purpose, since such layers have a higher index of refraction than anatase layers and can therefore provide higher reflection values which are very desirable in the case of facade elements and infilling panels. It has also been found that rutile films are much harder and much more resistant to abrasion than anatase films. Consequently, panes of glass where the $TiO_2$ interference film on the outside of the building has a rutile form can be exposed directly to the atmosphere without damage for a prolonged period of time. Also, the usual cleaning agents for outside surfaces of glass can be used to clean such panes or panels.

In some of the uses of $TiO_2$-coated glass panes or panels of the kind described, more particularly for use as a facade element or infilling panel, the glass must be toughened to comply with safety regulations. Toughening is necessary when infilling panels having rutile films are enamelled on the back. Because of the presence of the enamel coating, which is impervious to radiation, the glass may become so hot in sunshine that heat cracks would occur in an untoughened glass substrate. The glass is prestressed or toughened in known manner by being heated beyond its transformation temperature, the temperatures at which softening begins, and then cooled very abruptly. Temperatures of from about 570° to 620° C. are necessary for this purpose in the case of soda-lime-silicate glasses having the chemical composition of conventional flat glass.

The heating of the glass to toughen it in the manner described above may also be used to promote oxidation of the vacuum vapour-coated Ti film. Alternatively, the vapour-coated Ti layer can first be oxidised at a temperature of e.g. from 400° to 500° C., in one furnace, the pane with its $TiO_2$ coating being thereafter cooled and being subsequently heated again, for toughening, in another furnace to the temperature necessary to toughen the glass, i.e. between 570° to 620° C. in the case of soda-lime-silicate glass.

Theoretically, of course, oxidation of the Ti film to $TiO_2$ should be carried out very rapidly to provide an acceptable layer of $TiO_2$ in the rutile form. It is known from G. Hass, Vacuum Vol. 11, No. 4, p. 335, FIG. 3, that oxidation proceeds faster in proportion as the oxidation temperature is higher. Unfortunately, when in the known process the oxidizing temperature is increased to above 550° C. in order to promote rapid oxidation, alterations occur in the rutile layers, which turn matt and dull and cause so much light scatter both in transmission and reflection that panes having such layers cannot be used for the purposes mentioned—i.e., more particularly as infilling panels and facade elements. A peculiarity is that these changes in the film occur only in rutile films. When other vacuum vapour-coating conditions are used—i.e., more particularly a softer vacuum and/or longer vapour-coating time, oxidation leading in the manner described in $TiO_2$ layers having the anatase form and panes which have been coated in this way can be heated to relatively high temperatures, such as 550° C. or more, without experiencing any of the changes described in their coatings. Of course, the same difficulties of the rutile coatings undergoing changes always occur when the glass panes are toughened by heat treatment in the manner described, since for this purpose, and as already stated, the temperatures required are above 550° C. and in the case of soda-lime-silicate glasses are preferably of from 570° to 620° C. These unwanted changes in the coating occur when the panes are heated to the temperatures required for toughening irrespective of whether oxidation of the Ti layer to $TiO_2$ and heating to the glass toughening temperature are effected in a single step or whether the Ti layers are first oxidized at a relatively low temperature below 550° C. and only subsequently, possibly after further processing, are the panes heated to the temperatures necessary for toughening.

SUMMARY OF THE INVENTION

It is therefore an object of the invention to provide a heat-reflecting glass pane of the kind described, of use more particularly as an infilling panel or facade element, and a method for the production of such pane, wherein the $TiO_2$ layer is at least predominantly in the rutile form and the unwanted changes in the coating which occur when the glass is heated to temperatures above 550° C. such as are necessary for rapid oxidation of the Ti layer and such as are essential more particularly for toughening, are effectively inhibited.

According to one aspect of the invention, there is provided a heat reflecting pane comprising a substantially transparent glass substrate, a layer of silicon oxide on the glass substrate and a layer of $TiO_2$ on the side of the layer of silicon oxide remote from the glass substrate, said layer of $TiO_2$ being at least predominantly in the rutile form and having been formed by applying a Ti layer to the silicon oxide layer by vapour deposition in vacuo and subsequently oxidizing the Ti layer at high temperature.

According to another aspect of the invention, there is provided a method of manufacturing a heat-reflecting pane comprising the steps of providing a substantially transparent glass substrate, applying a silicon oxide layer to the glass substrate, applying a Ti layer to the side of said silicon oxide layer remote from the glass substrate by vapour deposition in vacuo, and subsequently heating the pane to at least 550° C. to oxidize the Ti layer to form a layer of $TiO_2$ at least predominantly in the rutile form, and subsequently cooling the pane.

The surprising discovery underlying the invention is that the unwanted changes in the $TiO_2$ film having a rutile structure upon heating to temperatures above 550° C. such as are necessary more particularly for toughening, can be obviated by the provision between the glass substrate and the rutile coating of a silicon oxide layer which must of course be applied before the vapour-coating of the Ti layer. The silicon oxide layer can of course also be produced by vapour deposition in vacuo. However, other known processes, e.g., pyrolytic separation—i.e., the conversion, at high temperature, of appropriate silicon compounds, more particularly of an organic nature applied initially to the substrate, into a silicon oxide layer,—can be used. The vapour deposition process for applying the silicon oxide layer is of course very advantageous, for if it is used the Ti layer can be applied immediately after the silicon oxide layer, in the same evacuated chamber. Examples of vapour deposition processes which may be used to apply the silicon oxide layer include electron beam evaporation of silicon dioxide and the evaporation of silicon monoxide from resistance-heated evaporators. In the latter process silicon oxide films are produced whose oxygen content varies in accordance with the vacuum conditions during the vapour-coating process. If silicon monoxide is evaporated reactively in a relatively poor vacuum of the order of $10^{-4}$ mm Hg, the resulting film corresponds approximately to the composition of $Si_2O_3$ (cf. E. Cremer, Th. Kraus and E. Ritter, "Uber das Absorptions-vermögen dünner Siliziumoxidschichten in Abhängigkeit vom Oxidationsgrad," Zeitschrift für Elektrochemie, Vol. 62, pp. 939–941 (1958)). However, if silicon monoxide is evaporated in a relatively hard vacuum of approximately $10^{-5}$ mm Hg, the films produced correspond substantially to the composition of SiO. Silicon oxide films have been found capable of inhibiting alterations in the rutile $TiO_2$ layer upon heating to temperatures of 550° C. or more, regardless of the oxygen content of the silicon oxide films. However, silicon oxide layers corresponding to the composition $Si_2O_3$ or $SiO_2$ are preferred where the glass substrate is of soda-lime-silicate glass, since the refractive indices of layers corresponding to the composition $SiO_2$ and $Si_2O_3$ correspond so closely to the refractive index of ordinary soda-lime-silicate glass that silicon oxide layers of these preferred compositions do not produce noticeable interference effects additional to that produced by the $TiO_2$ layer and which additional interference effects which might cause disturbing local variations in colour in cases where the thickness of the silicon oxide layer varies. The $Si_2O_3$ and $SiO_2$ films thus do not have to be extremely uniform in thickness, a consideration which is an advantage for the process. In the case of an SiO layer having a refractive index of approx. 1.9 the possibility of noticeable interference effects being produced is greater. However, even these are fairly weak, and so theoretically SiO films are suitable for the purposes of the invention, particularly if the thicknesses of the SiO layer is very small, e.g. of the order of 100 Å, which is the preferred order of thickness for the silicon oxide layer and is quite adequate for inhibiting the undesired alterations in the rutile layer referred to above, as this order of thickness is still very small as compared with the wavelengths of light in the visible part of the spectrum.

Values for the thickness of the intermediate film of silicon oxide of from approximately 30 to 200 Å have been found satisfactory.

DESCRIPTION OF THE PRIOR ART

German Offenlegungsshcrift No. 1,596,816 describes an arrangement in which titanium oxide and silicon dioxide layers are applied to a glass pane, but in this arrangement the silicon dioxide film is not disposed between the glass pane and the titanium oxide film, but, instead, the titanium oxide film is in direct contact with the glass pane, and thus the silicon oxide layer does not serve to inhibit the aforementioned undesirable alterations in a rutile layer. The same publication describes a film arrangement wherein a mixed film of silicon dioxide and titanium oxide is in contact with the glass panel or glass substrate, and only then are first a titanium oxide film and finally a silicon dioxide film applied. However, once again the silicon dioxide does not serve to inhibit the aforementioned undesirable alterations in a rutile layer. Similarly, CA Patent Specification No. 464,446, discloses film arrangements wherein a mixed film of titanium oxide and silicon dioxide, then films of titanium oxide alone or silicon dioxide alone, are disposed consecutively on a glass substrate, but nothing can be gathered from this publication—in which the silicon dioxide layer is applied by decomposition—which would lead to the solution proposed by the invention of providing a silicon oxide layer between a glass substrate and a Ti film to obviate the aforementioned undesirable alterations in a rutile layer produced by oxidation of the Ti film to $TiO_2$, during heating for the purpose of such oxidation or for the purpose of toughening the glass.

It is known from German Auslegeschrift No. 1,771,575 to form a titanium dioxide film on a germanium substrate which already has a thin silicon dioxide film. However, this disclosure does not suggest any solution to the problem solved by the present invention, i.e. that of preventing the aforesaid undesirable alterations at light temperatures, in a rutile layer applied to a glass substrate.

U.S. Pat. No. 2,478,817 gives a general disclosure of the production of $TiO_2$ films by dipping but does not suggest the provision of a silicon oxide film between a glass pane and a $TiO_2$ film. Arrangements in which glass is provided in succession with an Al layer, an $SiO_2$ layer and a $TiO_2$ layer and arrangements in which glass is provided in succession with a $TiO_2$ layer and a $SiO_2$ layer have been disclosed by Czechoslovak Patent Specifications 5051-66 and PV 4393-65, respectively, extracts from which were published in Glastechnische Berichte, P 40, June 1968 and P 11, February 1968, respectively, but there is no suggestion of the solution proposed by the present invention of providing a silicon oxide film between a glass substrate and a Ti film before oxidation of the Ti film at high temperatures in the manner necessary to prestress the glass pane.

Embodiments of the invention will be described in detail hereinafter with reference to the accompanying diagrammatic FIGURE.

BRIEF DESCRIPTION OF THE DRAWING

The single FIGURE forming the drawing is a view in section showing the construction of a heat-reflecting glass pane embodying the invention.

DESCRIPTION OF THE PREFERRED EMBODIMENT

As can be gathered from the FIGURE, a heat-reflecting glass pane embodying the invention comprises a substantially transparent glass substrate 10, more particularly of soda-lime-silicate glass, on one face of which is a silicon oxide layer 12 between 30 and 200 Å thick and preferably 100 Å thick. A $TiO_2$ film 10 is disposed on the side of the silicon oxide layer remote from the glass substrate. To produce the layers in this arrangement, first the silicon oxide film 12 is applied to the substrate and then a Ti film is applied to the silicon oxide film 12. The Ti film is then oxidised to $TiO_2$ in the rutile form by oxidation at an appropriate temperature of at least 550° C. The substrate in the preferred embodiment shown comprises thermally toughened glass, toughening having been effected by heating the pane after coating to a temperature of from 570° to 620° C., and then chilling the pane (i.e. cooling it rapidly). Preferably, oxidation of the Ti film and toughening of the glass substrate are effected substantially in one step by heating the glass pane, to which has been applied the silicon oxide film 12 and the Ti film, to a temperature in the range of from 570° to 620° C.—in the case of a substrate of soda-silicate glass—at which temperature the Ti film is converted into $TiO_2$ and the substrate 10 is at the temperature required for toughening, and thereafter chilling the pane immediately to toughen the glass. No impairments of the $TiO_2$ film 14 in the rutile form thus produced were observed.

Two examples will now be given, the first, Example 1, illustrating the result produced when the provision of a silicon oxide layer in accordance with the invention is omitted and the second, Example 2, illustrating, by way of comparison, the result when a silicon oxide layer is provided in accordance with the invention.

EXAMPLE 1

A float glass pane 8 mm thick and having external dimensions of 300 cm×245 cm was first cleaned by glow discharge in a vacuum-coating plant at a pressure of $3 \times 10^{-2}$ mm Hg conventionally, whereafter a Ti film was applied to the pane by vapour deposition at a pressure of $3 \times 10^{-5}$ mm Hg. The coated pane was then heated in a conventional toughening furnace to 620° C., then chilled. During the heating process the titanium film was oxidised to a $TiO_2$ film 520 Å thick and having the rutile form. However, the film was turbid and matt and was thus unsuitable, for architectural reasons, for use as an infilling panel or facade element, for a building or the like.

EXAMPLE 2

The same procedure as in Example 1 was followed but with the difference that, after the glow-discharge cleaning and before the application of the titanium film by vapour deposition, a 130 Å thick $Si_2O_3$ intermediate film was formed on the glass pane by reactive evaporation of silicon monoxide. The coated pane was toughened in the same way as in Example 1 after application of the Ti film. The $TiO_2$ film also had a rutile structure but, unlike the $TiO_2$ film in Example 1, the film was completely clear, so that the finished pane could be used very satisfactorily as an infilling panel or facade element for a building or the like.

We claim:

1. A heat reflecting pane comprising a substantially transparent glass substrate, a layer of silicon oxide on the glass substrate, the thickness of said silicon oxide layer being such that interference effects are not caused thereby, and a layer of $TiO_2$ on the side of the layer of silicon oxide remote from said glass substrate, said layer of $TiO_2$ being at least predominantly in the rutile form and having been formed by applying a Ti layer to said silicon oxide layer by vapor deposition in vacuo and subsequently oxidizing said Ti layer at a temperature of at least 400° C.

2. The pane of claim 1, in which the silicon oxide layer has a thickness of between 30 and 200 Å.

3. The pane of claim 2, in which the silicon oxide layer has a thickness of approximately 100 Å.

4. The pane of claim 1, in which the silicon oxide layer is in the form of $Si_2O_3$.

5. The pane of claim 1, in which the glass substrate has been toughened by being heated to at least 550° C. and then chilled.

6. The pane of claim 5 wherein the glass substrate has been toughened by being heated to between 570° C. and 620° C. and then chilled.

7. The pane of claim 1 wherein the glass substrate is of soda-lime-silicate glass.

* * * * *